United States Patent
Orii

(10) Patent No.: US 7,097,100 B2
(45) Date of Patent: Aug. 29, 2006

(54) CARD READER AND METHOD OF CONTROLLING THE CARD READER

(75) Inventor: Tsutomu Orii, Suwa-gun (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 10/826,848

(22) Filed: Apr. 16, 2004

(65) Prior Publication Data

US 2004/0262390 A1    Dec. 30, 2004

(30) Foreign Application Priority Data

Apr. 21, 2003  (JP) ............................. 2003-115486

(51) Int. Cl.
    *G06K 7/08*  (2006.01)

(52) U.S. Cl. ....................................................... 235/449
(58) Field of Classification Search ................. 235/449
    See application file for complete search history.

(56) References Cited

U.S. PATENT DOCUMENTS 4,847,475 A * 7/1989 Watabe et al. ............... 235/483
5,907,142 A * 5/1999 Kelsey ......................... 235/380

* cited by examiner

*Primary Examiner*—Thien M. Le
*Assistant Examiner*—Lisa M. Caputo
(74) *Attorney, Agent, or Firm*—Reed Smith LLP

(57) ABSTRACT

The card reader prevents fraudulent use of the data read from a magnetic card. The card reader takes a card having a magnetic stripe at a card insertion port into a card reader and a magnetic head reads data recorded on the magnetic stripe. The data read is saved and a timer is started. After a given time elapses, the saved data is made unavailable for reading.

11 Claims, 6 Drawing Sheets

CARD READER AND METHOD OF CONTROLLING THE CARD READER

FIELD OF THE INVENTION

The present invention relates to a card reader which reads data on a magnetic card having a magnetic stripe thereon (hereinafter referred to as "magnetic card") and a method of controlling the card reader. More specifically, it relates to a card reader that prevents fraudulent use of the data read from the magnetic card and a method of controlling the card reader.

BACKGROUND OF THE INVENTION

Among all card readers characterized above, there is card reader (100) of the manual type as illustrated in FIG. 5. The manual type card reader comprises: a frame (102) having a card insertion port (101); a channel (103) continuing in the card insertion direction to accommodate insertion and discharge of a magnetic card (105); and a magnetic head (104) arranged at a side of channel (103) for detecting magnetic card (105).

The process steps in which manual card reader (100) reads data from magnetic card (105) to send it to a higher level apparatus is described herein with reference to the flow chart illustrated in FIG. 6.

Insertion of magnetic card (105) is recognized by magnetic head (104) when magnetic head (104) reads the data on magnetic stripe (106). While waiting for insertion of magnetic card (105), magnetic head (104) reads no data from magnetic stripe (106). Therefore, it determines that magnetic card (105) is not considered to be inserted to card reader (100) (No for Step 101; step is designated as "S" hereinafter).

As magnetic card (105) is inserted into channel (103) through card insertion port (101), magnetic head (104) reads data recorded on magnetic stripe (106) of magnetic card (105), then insertion of magnetic card (105) is detected (Yes for S 101). Magnetic head (104) reads data on magnetic stripe (106) (S 102), and edits the data it has read (S 103). The data being edited stays until the data transmission to a higher level apparatus (S 104) is authorized. A requirement for authorization of the data transmission is detection of magnetic card (105) by rear sensor (107) in card reader (100). When the data transmission is authorized (Yes for S 104), the data is sent to a higher level apparatus (S 105).

In order to accurately transmit the data read from magnetic card (105) to a higher level apparatus, the data is held within card reader (100) until the data transmission to a higher level apparatus is authorized in this card reader (100). The data is deleted when one of the following conditions is met: (i) rear sensor (107) detects presence of magnetic card (105), which authorizes data transmission, then the data is sent to a higher level apparatus; or (ii) rear sensor (107) detects the magnetic card (105) at a given position, and a "delete" command is executed upon detection described in section (ii), then the data is sent to a higher level apparatus.

Nonetheless, the above card reader (100) of conventional technology has a drawback in that it holds the data read from magnetic card (105) internally until a higher level apparatus receives the data. The data being held in card reader (100) may be used for a fraudulent purpose by a third party, not the holder of magnetic card (105). For example, a person may trick rear sensor (107) to fail accurate detection of positions of magnetic card (105). Even though a deceptive mechanism is created in card reader (100), data on magnetic card (105) can be read and saved as usual when a card holder inserts magnetic card (105) to the card reader (100). In this case, since rear sensor (107) fails to detect the arrival of magnetic card (105) at a given position, authorization does not occur and the data is not sent to a higher level apparatus. The data is left in card reader (100) as a result of not being cleared. As soon as the holder of magnetic card (105) leaves card reader (100), the person with a malicious intent can use the data held in card reader (100).

The object of the present invention, therefore, is to provide a card reader that can discourage fraudulent use of the data being read from a magnetic card and a method of controlling the card reader.

SUMMARY OF THE INVENTION

To accomplish the object, the present invention provides a card reader which takes a magnetic card at a card insertion port into a card reader and reads data recorded on the magnetic stripe by a magnetic head. The data read is saved and a timer is started and the saved data is made unavailable for reading after a given time elapses.

The present invention also provides a card reader which takes a card having a magnetic stripe at a card insertion port into a card reader and read data recorded on the magnetic stripe by a magnetic head wherein the data read is saved and edited, then a timer is started. The saved data and/or the edited data are/is made available for reading after a given time elapses.

The present invention saves the read data and starts a timer. After a given time elapses, the present invention prevents the data once read from the magnetic stripe from being read again. Alternately, after the read data is saved and edited and a timer is started, the present invention makes reading of the data saved and/or edited unavailable for reading after a given time elapses. If the data being saved and/or edited is not sent to a higher level apparatus after a given time elapses, the card reader and the method of controlling the card reader of the present invention concludes that there is an abnormal situation and does not allow a third party to read the data being saved or edited. Fraudulent use of the data read from the magnetic card is thus prevented.

After the data is saved or edited in a normal data processing, the data can be sent to a higher level apparatus quickly, that is, within a given time during which the data can be read to complete transactions requested by the card holder. In this way, the possibility of shutting off the card holder from his transactional needs is eliminated.

In the card reader of the present invention, the data saved and/or the data edited are/is deleted after a given time elapses, thereby making the data unavailable for reading in the card reader of the present invention. In this case, the data is completely deleted. Therefore, a person with a fraudulent intent can never access the data recorded on the third party's magnetic card.

The card reader of the present invention further turns off a flag which enables reading of the data saved and/or edited after the given time elapses, thereby making the data unavailable for reading. Turning off the flag alone prevents the data from fraudulent reading of the data on a third party's magnetic card, eliminating the need for deletion of data left in the card reader.

As described above, when the data being saved or edited is not sent to a higher level apparatus after a given time elapses, the card reader and the method of controlling the card reader of the present invention concludes that an abnormal situation occurred and does not allow a third party to read the data being saved and/or edited. For this reason, even though a person with a fraudulent intent introduces a deceptive mechanism to a sensor to cause the card reader to retain the data read from a magnetic card, the data of interest is deleted after a given time elapses. Fraudulent use of the data read from the magnetic card does not happen.

DESCRIPTION OF PREFERRED EMBODIMENT

Embodiments of the present invention are described herein with reference to the drawings.

Figure 1:
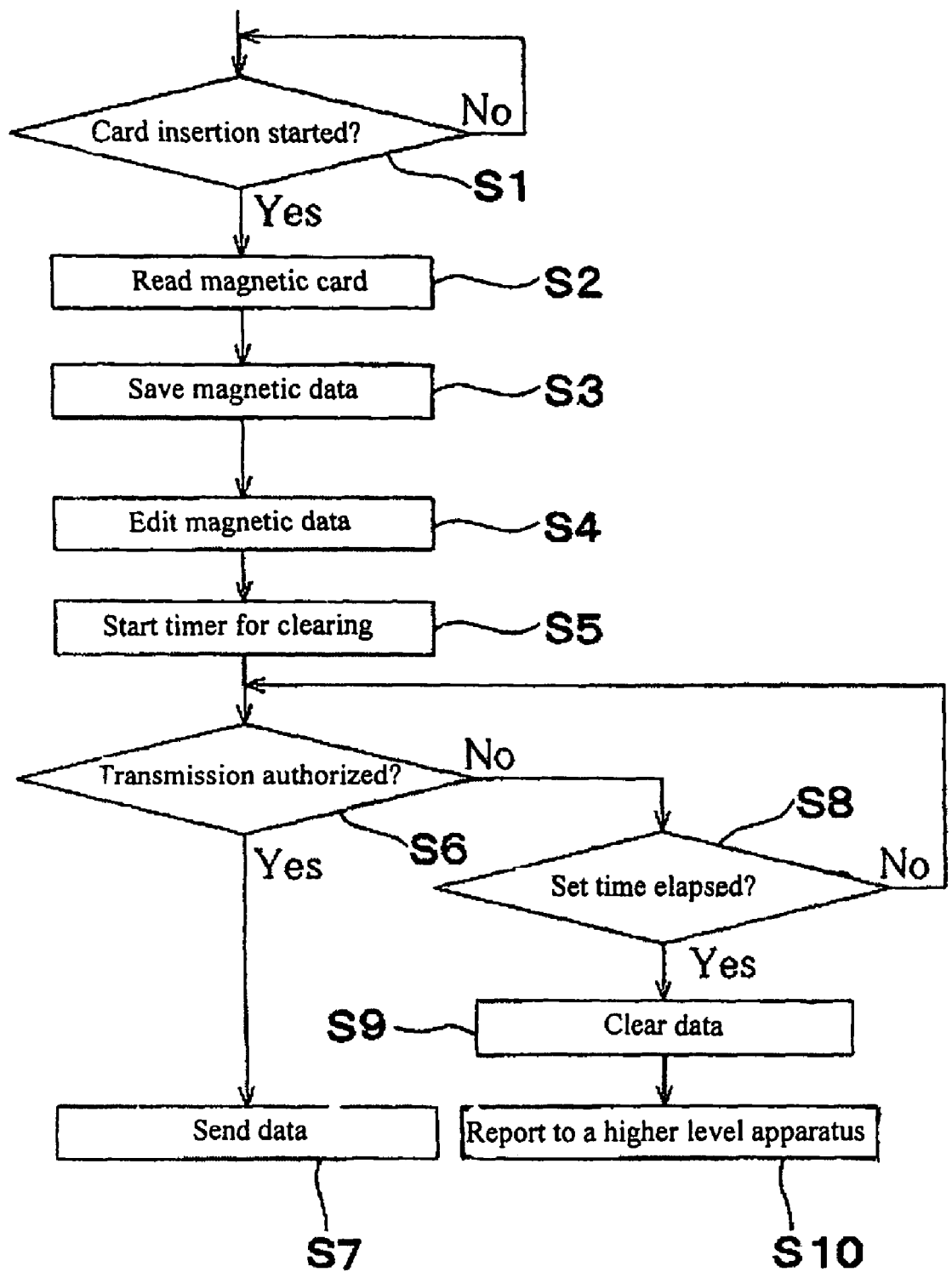
FIG. 1 is a flow chart illustrating operations of the card reader of the present invention.
Figure 2:
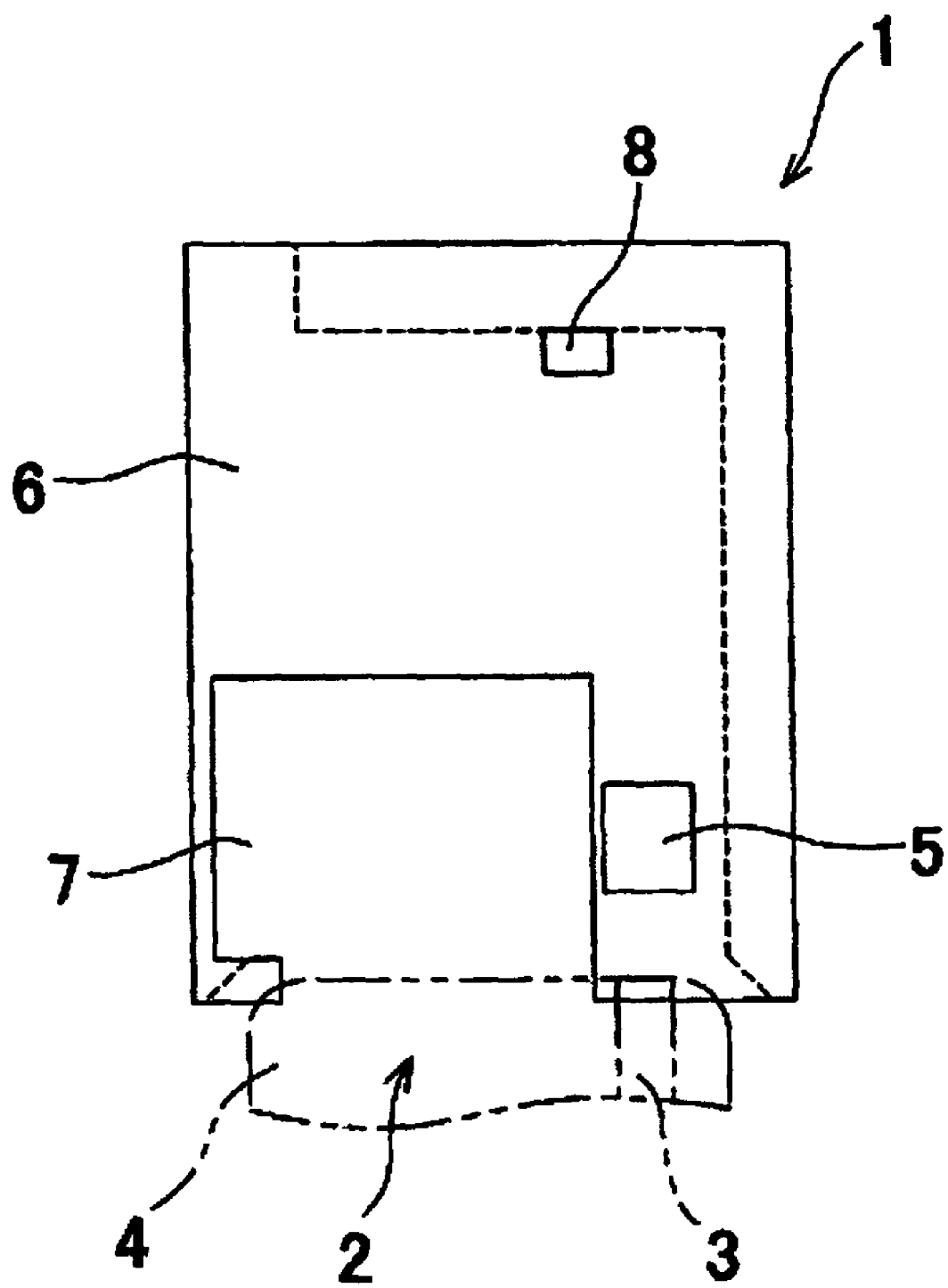
FIG. 2 is a plan view illustrating the card being inserted into the card reader thereof.
Figure 3:
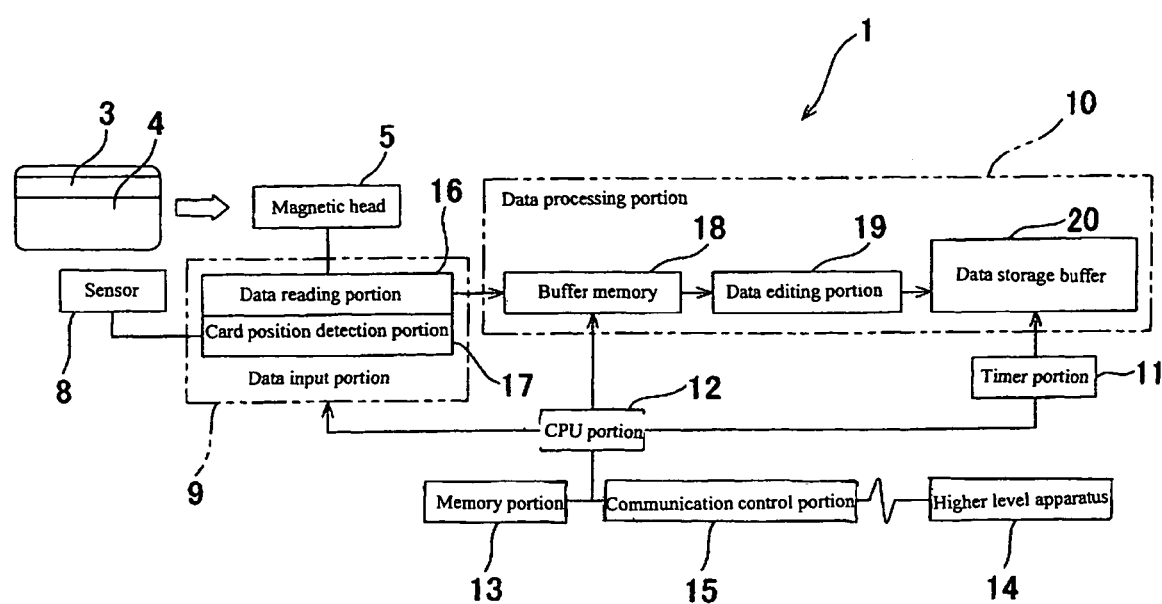
FIG. 3 is a block diagram illustrating the control system of the card reader thereof.

Embodiment 1 of card reader (1) of the present invention is illustrated in FIGS. 1–3. Card (4) having a magnetic stripe (3) is inserted into card reader (1) through card insertion port (2). Magnetic head (5) reads the data recorded on magnetic stripe (3). Card reader (1) saves the data it reads and edits the data it has saved, then, it starts a timer such that the data is made unavailable for reading after the given time elapses. Herein, the data is deleted after a given time elapses, thereby making the data unavailable for reading.

Card reader (1) is a manual type card reader which comprises: card insertion port (2), a frame (6) having a card insertion port (2) thereon; a channel (7) is extended in the card insertion direction. Magnetic card (4) is inserted at card insertion port (2) to the stop position to start a transaction and is pulled out when all transaction are completed. Magnetic head (5) is arranged at a side of channel (7). Card reader (1) is the dip type which reads data from magnetic card (4) at the point of insertion and discharge of magnetic card (4). Note that rear sensor (8) is provided at the deepest end of frame (6) where the tip of magnetic card (4) reaches when magnetic card (4) is fully inserted therein.

Card reader (1), as illustrated in FIG. 3, further comprises: a data input portion (9); a data processing portion (10); a timer portion (11); a CPU portion (12) that controls the above components; a memory portion (13) that saves a control program of CPU portion (12) or provides a similar function; a higher level apparatus (14); and a communication controlling portion (15) that transmits data.

Data input portion (9) is made up with a data read-out portion (16), which is connected to magnetic head (5) to read data from magnetic stripe (3), and card position detection portion (17), which is connected to magnetic head (5) and rear sensor (8) to detect positions of a card. Data processing portion (10) is constructed with a buffer memory (18), which saves the data read from magnetic head (5) without editing it; a data editing portion (19), which rearrange processing sequence of the unedited data in accordance with given conditions; and a data storage buffer (20), which saves the edited data. Buffer memory (18) and data storage buffer (20) are storage media such as RAM. The editing of the read data stored in the buffer memory may be done by a specialized processing circuit such as the data editing portion (19) or a general processing circuit such as the CPU portion 12.

Timer portion (11) starts measuring time after the data is edited by data editing portion (19) and the data saved in data storage buffer (20) is deleted after a given time elapses. Now, the given time is defined by the time required for a person with a fraudulent intent to begin operating card reader (1) as soon as a card holder of magnetic card (4) leaves card reader (1). In the embodiment of the present invention, the time is set to 5 seconds, for example.

Operations of the above card reader (1) are described herein with reference to the flow chart illustrated in FIG. 1. In this method of controlling card reader (1), the data once read is saved and edited, then, a timer is started. After a given time elapses, one can no longer read the edited data.

Insertion of magnetic card (4) is detected when magnetic head (5) reads data on magnetic stripe (3). While card reader 1 waits for completion of insertion of magnetic card (4), magnetic head (5) does not read data, then, card reader (1) deems that magnetic card (4) is not inserted (No for S1).

When magnetic card (4) is inserted at card insertion portion (2) to channel (7), magnetic head (5) reads data recorded on magnetic stripe (3) of magnetic card (4) and card position detection portion (17) detects insertion of magnetic card (4) (Yes for S1). The data reading portion (16) then reads data on magnetic stripe (3) thereof (S2). The data being read is saved in buffer memory (18) (S3), edited by data editing portion (19) (S4), and saved in data storage buffer (20), when timer portion (11) starts running timer (S5).

At this stage, presence of authorization that allows the edited data to be sent to higher level apparatus (14) (S6) is checked. A condition for authorization is detection of magnetic card (4) by rear sensor (8). If an authorization is issued and the data is ready for transmission (Yes for S6), the data is sent to higher level apparatus (14) (S7).

If the transmission is not authorized (No for S6), timer portion (11) is checked to see if the time set in a timer has elapsed (S8). If the given 5 seconds have not passed as yet (S8), card reader (1) further waits for authorization thereof (S6). If the given 5 seconds have already passed (S8), card reader (1) recognizes an abnormal condition, when timer portion (11) deletes the data saved in data storage buffer (20) (S9). In this way, after a given time elapses, a person with a fraudulent intention is entirely unable to read the data on another's magnetic card (4) being read and left in card reader (1). Fraudulent use of the data once read from magnetic card (4) of a third party is thus prevented. Deletion of data is reported to higher level apparatus (14) (S10).

Note that applications of the present invention are not limited to the above embodiment of the present invention. A variety of modifications are possible as long as the spirit of the present invention remains the same. For example, data is deleted after a given time elapses to make the data unavailable for reading in the above embodiment. Nonetheless, data can be made unavailable for reading by turning off a flag (which enables reading of the data) after a given time elapses.

In the above embodiment, it is the data saved in data storage buffer (20) that is deleted in (S9) in FIG. 1. However, the data saved in buffer memory (18) may be deleted together with the data saved in data storage buffer (20) in (S9) thereof. This will further enhance preventative effect of the present invention on fraudulent use of the data read from magnetic card (4). Alternatively, the data saved in buffer memory (18) only may be deleted if the situation allows.

A given time for waiting before data transmission is set to 5 seconds in the above embodiment. However, it may be 30 seconds for example, as long as the time is defined by the time required for a person with a fraudulent intent to begin operating card reader (1) as soon as the holder of magnetic card (4) leaves card reader (1). The given time for waiting may be provided as a variable factor.

Also, in the above embodiment, it is magnetic head (5) that detects insertion of magnetic card (4) into card reader (1). However, a detection means is not limited to this. A separate sensor which is dedicated to detect card insertion may be adopted.

Further, in the above embodiment, card reader (1) is of the dip type. However, it may be the swipe type. Also, card reader (1) used in the above embodiment is the manual type. Nonetheless, the type is not limited to this and it may be the motor driven automatic type.

Figure 4:
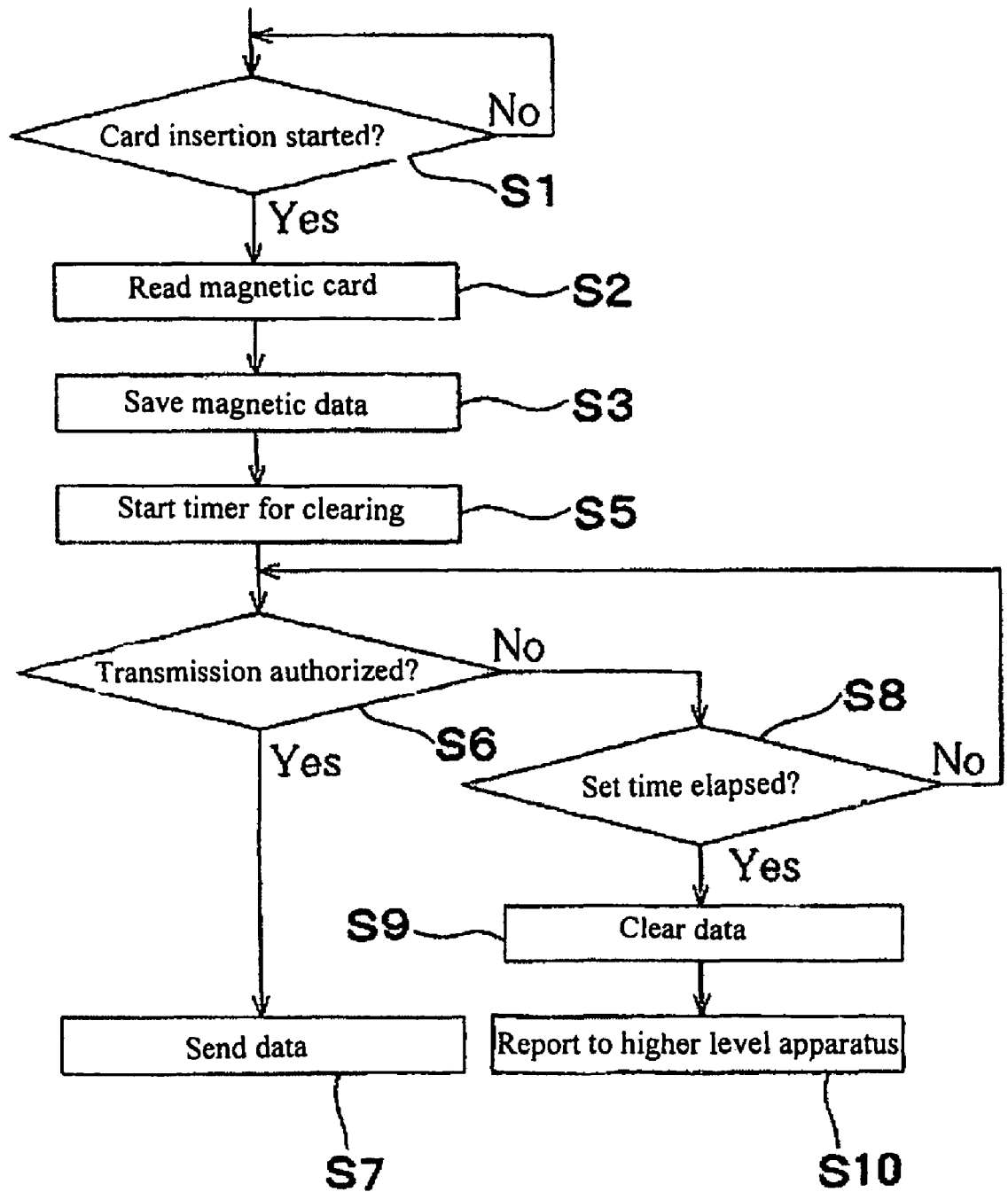
FIG. 4 is a flow chart illustrating operations of the card reader of another embodiment of the present invention.
Figure 5:
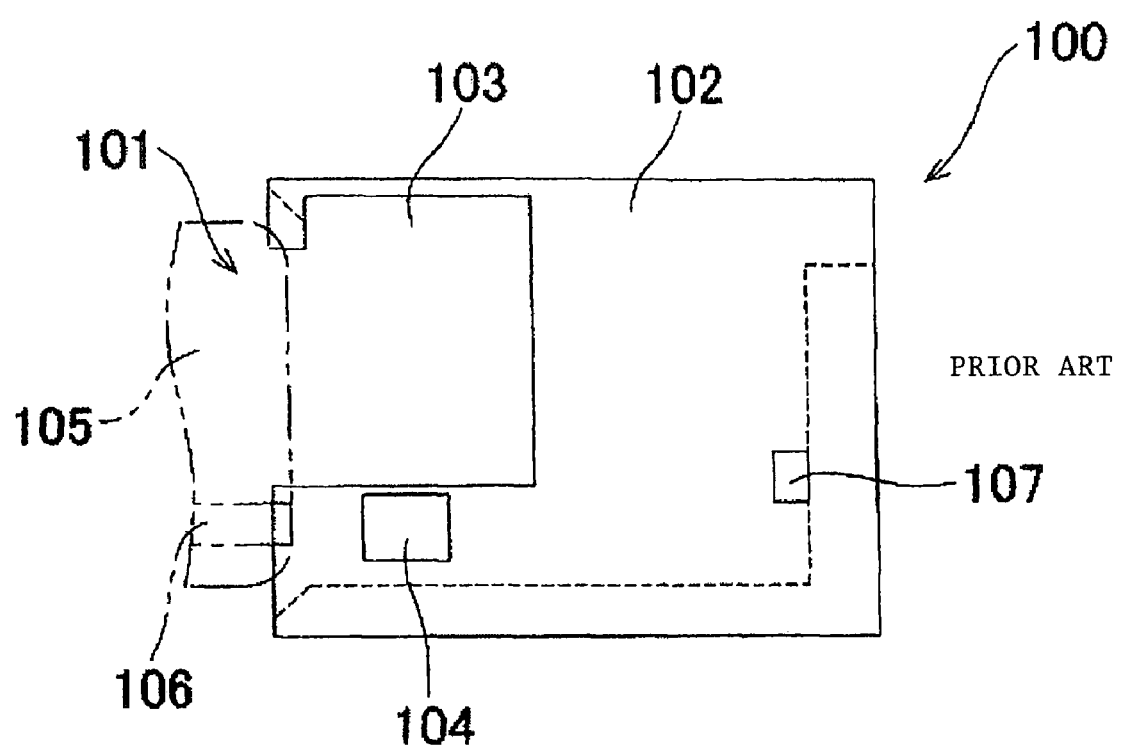
FIG. 5 is a plan view illustrating the card being inserted into the card reader of conventional technology.
Figure 6:
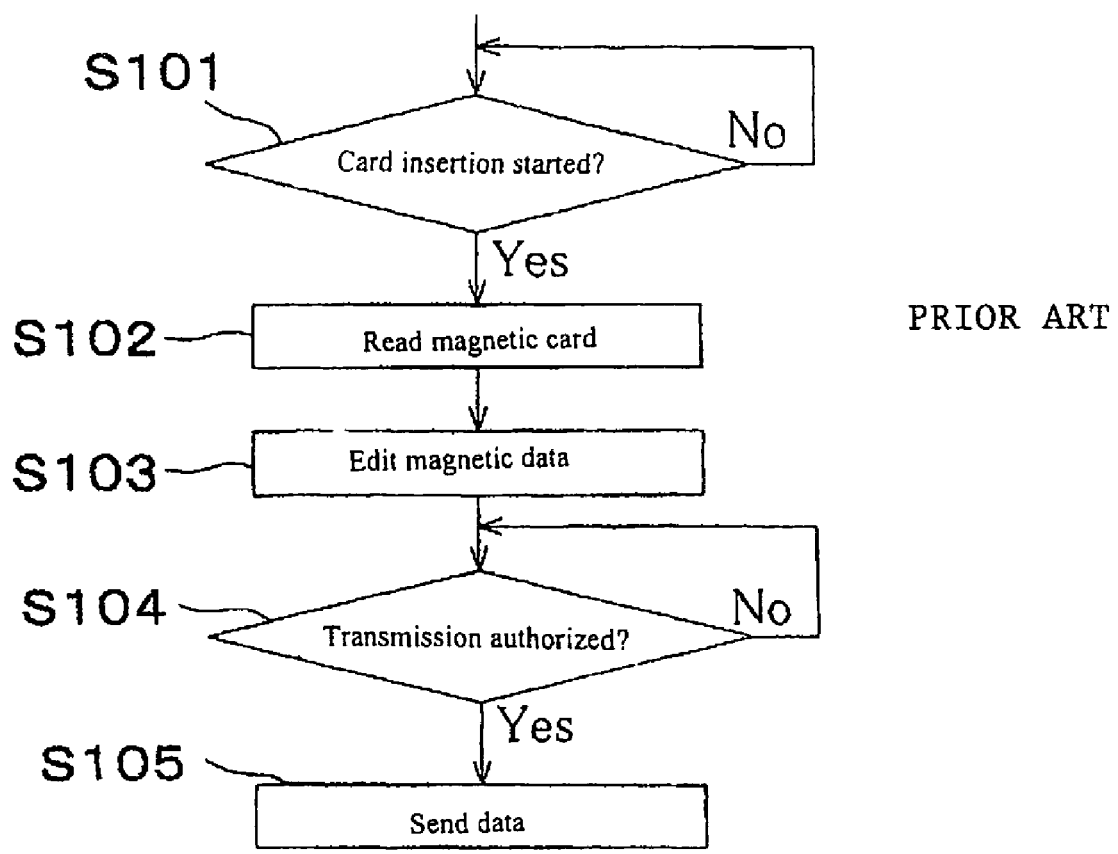
FIG. 6 is a flow chart illustrating operations of the card reader of conventional technology.

Moreover, in the above embodiment, data processing portion (10) in card reader (1) comprises: a data editing portion (19); and data storage buffer (20); data saved in buffer memory (18) is edited by data editing portion (19), and then, a timer is started intimer portion (11). However, the data saved in buffer memory (18) does not always need to be edited. In other words, as illustrated in FIG. 4, the data read from magnetic stripe (3) of magnetic card (4) may be saved in buffer memory (18) (S3), and then, a timer in timer portion (11) may be started (S5). In this case, the data saved in buffer memory (18) is deleted in (S9). Note that when the data saved in buffer memory (18) is not edited, data processing portion (10) does not need to have data editing portion (19) and data storage buffer (20).

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A method of preventing fraudulent use of data read from a magnetic stripe of a card, the method comprising:
   reading data recorded on the magnetic stripe by a magnetic head;
   saving the read data for data transmission to a higher level apparatus;
   starting a timer for detecting elapsing of a given time period, the given time period being determined so as to prevent fraudulent use of the read data;
   waiting for authorization for data transmission of the saved data to the higher level apparatus; and
   after starting the timer, when the saved data is not transmitted to the higher level apparatus within the given time period, making the saved data unavailable for reading.

2. The method according to claim 1, wherein the step of making the saved data unavailable for reading includes deleting the saved data.

3. The method according to claim 1, wherein the step of making the saved data unavailable for reading includes changing a flag which makes the saved data either available or unavailable for reading.

4. The method according to claim 3, wherein the step of changing a flag includes turning off the flag which makes the saved data available for reading.

5. A method of preventing fraudulent use of data read from a magnetic stripe of a card, the method comprising:
   reading data recorded on the magnetic stripe by a magnetic head;
   saving and editing the read data for data transmission to a higher level apparatus;
   starting a timer for detecting elapsing of a given time period, the given time period being determined so as to prevent fraudulent use of the read data;
   waiting for authorization for data transmission of the saved and edited data to the higher level apparatus; and
   after starting the timer, when the saved and edited data is not transmitted to the higher level apparatus within the given time period, making the saved and edited data unavailable for reading.

6. The method according to claim 5, wherein the step of making the saved and edited data unavailable for reading includes deleting the saved and edited data.

7. The method according to claim 5, wherein the step of making the saved and edited data unavailable for reading includes changing a flag which makes the saved and edited data either available or unavailable for reading.

8. The method according to claim 7, wherein the step of changing a flag includes turning off the flag which makes the saved and edited data available for reading.

9. A method of preventing fraudulent use of data read from a magnetic stripe of a magnetic card by a card reader, the method comprising:
   reading data recorded on the magnetic stripe by a magnetic head located within the card reader for data transmission to a higher level apparatus, the magnetic card not being a part of the card reader;
   saving the read data;
   after the data is read, starting a timer in the card reader for a given time period, the given time period being determined so as to prevent fraudulent use of the data read from the magnetic stripe; and
   if the timer lapses, making the saved data unavailable for reading.

10. The method according to claim 9, wherein the step of making the saved data unavailable for reading includes deleting the saved data.

11. The method according to claim 9, wherein the step of making the saved data unavailable for reading includes changing a flag which makes the saved data either available or unavailable for reading.

* * * * *